(No Model.)
C. A. ANDERSON & J. FOGARTY.
FRICTION CLUTCH.
No. 425,482. Patented Apr. 15, 1890.
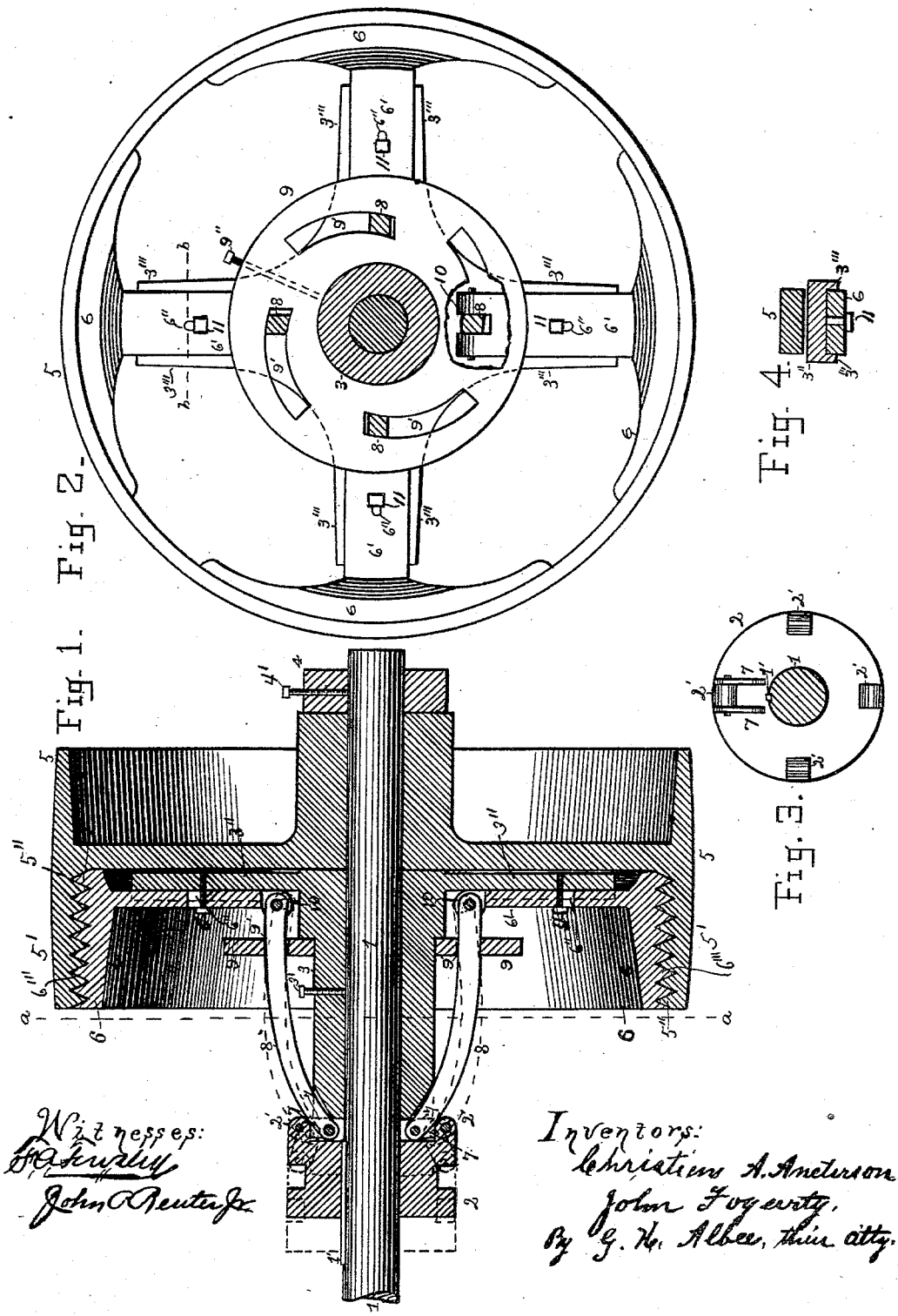
Witnesses:
Inventors:
Christian A. Anderson,
John Fogarty,
By G. H. Albee, their atty.

UNITED STATES PATENT OFFICE.

CHRISTIAN A. ANDERSON AND JOHN FOGARTY, OF KAUKAUNA, WISCONSIN; SAID FOGARTY ASSIGNOR TO SAID ANDERSON.

FRICTION-CLUTCH.

SPECIFICATION forming part of Letters Patent No. 425,482, dated April 15, 1890.

Application filed March 11, 1889. Serial No. 302,916. (No model.)

*To all whom it may concern:*

Be it known that we, CHRISTIAN A. ANDERSON and JOHN FOGARTY, both citizens of the United States, residing at Kaukauna, in the county of Outagamie and State of Wisconsin, have invented certain new and useful Improvements in Friction-Clutches, of which the following is a specification.

Our invention relates to that class of friction-clutches in which radially-movable friction-arms are applied to a flanged pulley.

The object of our invention is to provide improved mechanism for operating the friction-arms, whereby great power may be obtained to afford a firm connection between the pulley and the friction-arms; and our invention also consists in providing the friction-arms with levers operated by suitable mechanism and provided with improved devices for adjusting their fulcra.

In the accompanying drawings, illustrating our invention, Figure 1 is a vertical central cross-section through a belt-pulley with our improvements applied. Fig. 2 is a side elevation of the same, showing the shaft and operating-levers in section on the line *a a* of Fig. 1. Fig. 3 is a detail view showing the manner of connecting the operating-levers to the sliding block to which the shifting-lever is applied, and Fig. 4 is a cross-section on the line *b b* of Fig. 2.

The pulley 5 is loosely mounted on a shaft 1, and is held in place by a collar 4, which bears against the hub of the pulley, and which is held in place on the shaft by a set-screw 4'. The pulley 5 is formed with a laterally-projecting flange 5', having a series of circumferential V-shaped grooves or corrugations 5'' on its inner face.

A hub 3 is secured by means of a set-screw 3' to the shaft 1, close to the spider or main body of the pulley 5. The hub is provided with radially-projecting arms 3'', (four being shown in the drawings,) arranged equal distances apart and lying close to the spider or body of the pulley. The arms 3'' terminate a short distance from the flange 5', and are provided with flanges 3''', which form guides for the shanks 6' of the friction-arms 6. The friction-arms are shown as formed with enlarged heads corresponding in width to the width of the flange 5', and are formed with grooves and corresponding ridges 6''', conforming with the grooves or corrugations on the inner face of the flange of the pulley. The shanks 6' of the friction-arms are secured to the arms 3'' of the hub 3 by means of headed bolts 11, which extend through slots 6'' in the shank 6'. These slots are sufficient in length to permit the radial adjustment of the friction-arms. The lower ends of the friction-arms are hinged or jointed at 10 to the inner ends of the curved operating-levers 8. These levers extend horizontally from the friction-arms beyond the end of the hub 3, and are hinged or jointed to short links 7, which are in turn hinged or jointed to the laterally-projecting lugs or ears 2' of the sliding shifting-block 2. This block is secured to the shaft 1, so as to revolve therewith, by a feather 1'.

The position of the friction-arms, levers, links, &c., when the arms engage with the pulley is shown by full lines. The position of the operating-levers, links, and shifting-block when the arms are withdrawn is shown by dotted lines.

Near their inner ends the operating-levers 8 are supported by a fulcrum plate or disk 9. As shown, this plate or disk is secured to the hub 3 by a set-screw 9'', and it may be turned on the hub and adjusted, when desired. The plate 9 is provided with a series of eccentric slots 9'—one for each operating-lever. The levers 8 extend through these slots and have their fulcra on the plate within the slots. The throw or movement of the levers will of course depend on the position of the fulcra relatively to the shaft, and by turning the plate and adjusting it the fulcra may be adjusted readily to vary the throw of the levers, which, when the plate is adjusted, take new positions in the eccentric slots 9'. This adjustment of the fulcra is desirable, especially to compensate for wear on the friction-surfaces of the pulley and the friction-arms, so that after constant or long-continued use, when the friction-arms would otherwise incompletely perform their office, the levers may be so adjusted as to provide for a firm connection between the pulley and the friction-arms.

It will be observed that the fulcra of the operating-levers are simultaneously adjustable. This is an important feature of our invention. The adjustment may be made for all the arms very quickly, and by one operation the same amount of adjustment is given to all the arms.

Obviously, so far as part of our invention is concerned, the details of construction may be varied. The fulcrum-plate may have its position changed so as to connect with the levers at a different point from that shown in the drawings, and the specific construction of the pulley, friction-arms, and operating mechanism may be changed without departing from the novel features of our invention.

We claim as of our own invention—

1. The combination, substantially as hereinbefore set forth, of radially-movable friction-arms, their operating-levers, and simultaneously-adjustable fulcra for the operating-levers.

2. The combination, substantially as hereinbefore set forth, of a radially-movable friction-arm, an operating-lever, and a fulcrum-plate having an eccentric slot through which the lever extends.

3. The combination, substantially as hereinbefore set forth, of radially-movable friction-arms, their operating-levers, and an adjustable fulcrum-plate having eccentric slots through which the levers extend.

4. The combination, substantially as hereinbefore set forth, of a flanged pulley, the shaft on which it is mounted, radially-movable friction-arms, their operating-levers, the fulcrum-plate having eccentric slots, in which the levers have their bearings, and the laterally-sliding shifting-block, to which the outer ends of the operating-levers are jointed.

5. The combination, substantially as hereinbefore set forth, of the pulley, the radially-movable friction-arms engaging therewith, the operating-levers jointed to the inner ends of the friction-arms, the fulcrum plate or disk, in which eccentric slots are formed corresponding in number to the arms, and so formed as to have the same relative position to the axis of the pulley, so that when the disk is adjusted the fulcra of the operating-levers may be simultaneously and correspondingly adjusted.

6. The combination, substantially as hereinbefore set forth, of the flanged pulley, the shaft on which it is mounted, the hub having radially-projecting flanged arms, means for securing the friction-arms to the flanged arms, the fulcrum disk or plate adjustably secured to the hub, the operating-levers extending through slots in the fulcrum-plate and jointed to the inner ends of the friction-arms, the sliding shifting-block having laterally-projecting lugs or ears, and links jointed to these ears, and also jointed to the outer ends of the operating-levers.

CHRISTIAN A. ANDERSON.
JOHN FOGARTY.

Witnesses:
F. A. TOWSLEY,
JOHN P. REUTER, Jr.